April 29, 1952 A. M. TRIPP 2,594,828
AUTOMATIC SELF-LOCKING INDEXING HEAD
Filed June 3, 1947 2 SHEETS—SHEET 1
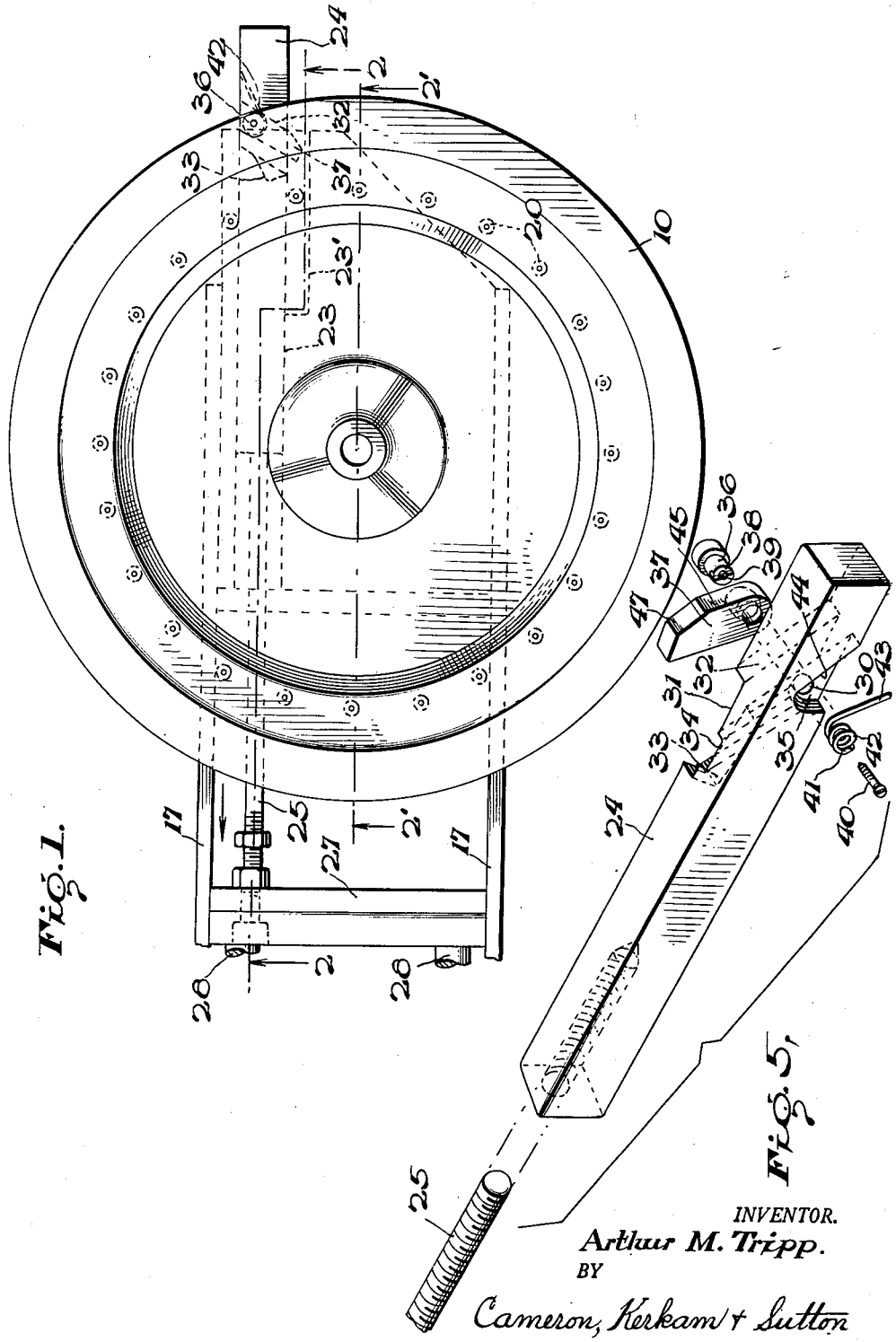
INVENTOR.
Arthur M. Tripp.
BY
Cameron, Kerkam + Sutton
Attorneys

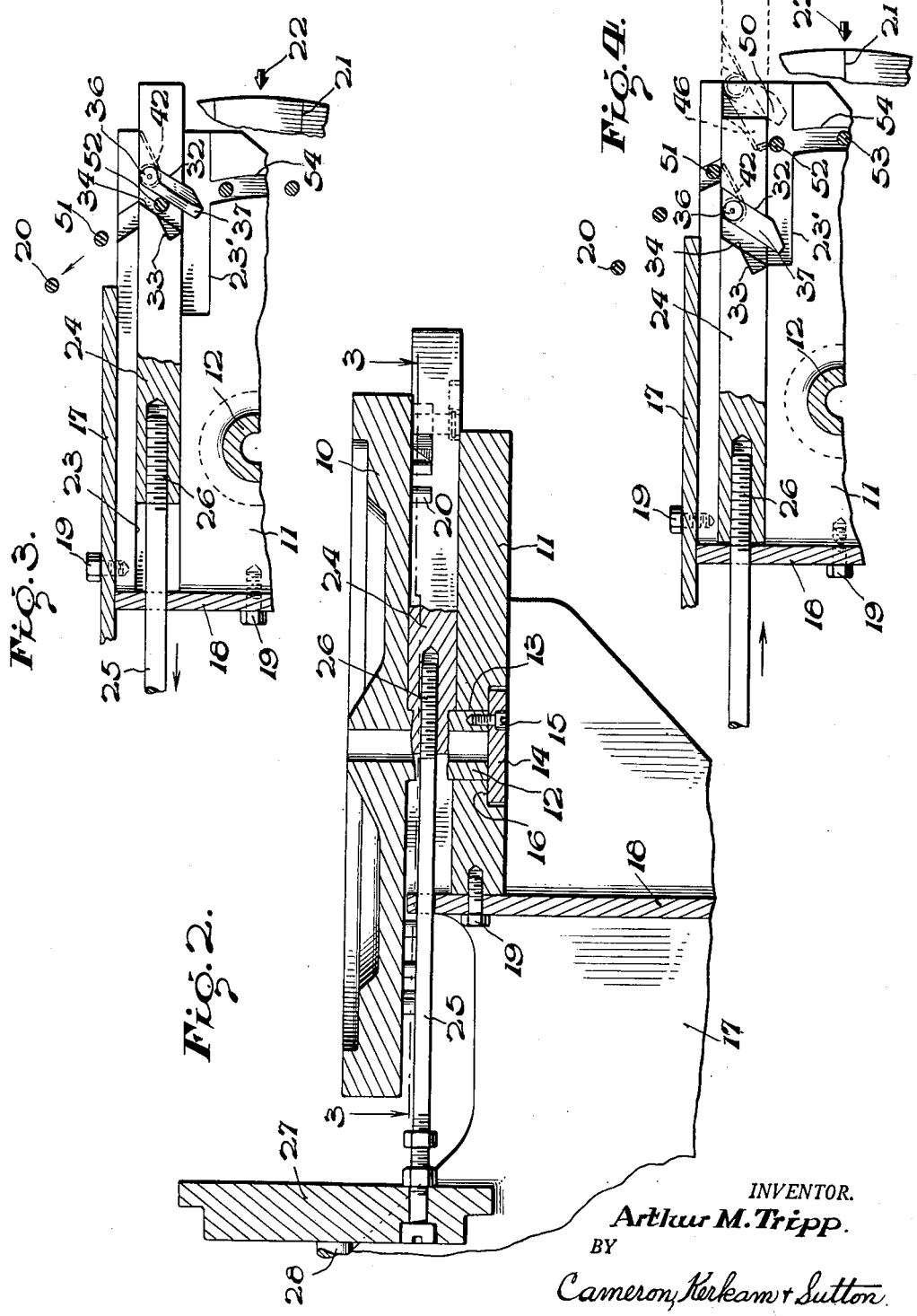

Patented Apr. 29, 1952

2,594,828

UNITED STATES PATENT OFFICE 2,594,828

AUTOMATIC SELF-LOCKING INDEXING HEAD

Arthur M. Tripp, Knoxville, Tenn., assignor to Robertshaw-Fulton Controls Company, a corporation of Delaware Application June 3, 1947, Serial No. 752,235

6 Claims. (Cl. 29—50)

1

This invention relates to an improved automatic self-locking indexing head, and more particularly to a rotary indexing head and automatic actuating and self-locking mechanism for the same that is susceptible to a wide variety of uses on machine tools, die presses and other suitable machinery or equipment requiring an indexing head for carrying or locating a plurality of tools, work pieces or other objects to be brought in sequence into a predetermined position or positions.

It is an object of this invention to provide an improved device of the type characterized which is simple and economical to construct and operate and yet positive and certain in operation.

Another object of this invention is to provide an improved device of the type characterized wherein a plurality of indexing points may be simply but accurately arranged at predetermined equally spaced points around the circumference of a rotary indexing head.

Another object of this invention is to provide an improved device of the type characterized which assures that there shall be accurate register between predetermined points on the rotary indexing head and one or more fixed points exteriorly thereof.

Another object of this invention is to provide an improved device of the type characterized which includes mechanism for positively indexing the rotary indexing head and then automatically locking the same rigidly against displacement at its several points of registration.

Another object of this invention is to provide an improved device of the type characterized which can be readily adapted to actuation from various sources of power and by various forms of actuating mechanism.

Another object of this invention is to provide an improved device of the type characterized wherein the rotary indexing head and its actuating and self-locking means may be readily constructed so as to constitute a unitary assembly.

Another object of this invention is to provide an improved device of the type characterized which is composed of simple parts that are easy to fabricate and assemble.

Other objects will appear as the description of the invention proceeds.

The invention is capable of receiving a variety of mechanical expressions one of which is shown on the accompanying drawings, but it is therefore to be expressly understood that the drawings are for purposes of illustration only, and are not to be construed as a definition of the limits of the invention, reference being had to the appended claims for that purpose.

2

Referring in detail to the accompanying drawings, wherein the same reference characters are employed to designate corresponding parts in the several figures, Fig. 1 is a plan view of the rotary indexing head with certain parts of the under structure and actuating and self-locking mechanism shown in dotted lines;

Fig. 2 is a cross sectional view of the rotary indexing head, under structure and actuating and self-locking mechanism, the section of the actuating and self-locking mechanism being taken substantially on the line 2—2 of Fig. 1 and the section of the rotary indexing head and its under structure being taken substantially on the line 2'—2' of Fig. 1;

Fig. 3 is a fragmentary plan view, partly in section on line 3—3 of Fig. 2, of the actuating and self-locking mechanism, and also showing a fragment of the rotary indexing head and some of the indexing pins carried thereby;

Fig. 4 is a view similar to Fig. 3 but illustrating in full and dotted lines other positions of the actuating and self-locking mechanism in its cycle of operations; and Fig. 5 is a perspective exploded view of the actuating and self-locking mechanism.

In the form shown, a rotary indexing head 10 of any suitable size and construction, for carrying or locating tools, work pieces and other articles to be indexed to a predetermined position or positions, is rotatably mounted in any suitable way upon a frame of any suitable construction including a base plate 11. As illustrated, said indexing head 10 has a tubular or cylindrical hub 12 rotatably received in an aperture 13 provided in the base plate 11 and secured against axial movement in said aperture by a retainer plate 14 suitably secured to the hub 12, as by a set screw 15, and having bearing engagement with the under face 16 of a recess provided in the under face of said base plate. Said frame is also shown as including a pair of side members 17 between which extend one or more cross members 18, said side and transverse members being suitably secured to said base plate 11 as by screws 19. Thereby the base plate 11 with its supporting frame members and the rotary indexing head 10, as well as the actuating and self-locking mechanism to be described, constitute a unitary assembly that may be applied to any suitable mechanism wherein the indexing function is to be obtained.

Secured in any suitable way to the under face of the rotary indexing head 10 is any suitable number of depending index pins 20 disposed at equal spacing in a circle coaxial with the axis of rotation of the head 10. In order to facilitate visual identification of the locations of the respective pins 20 said indexing head 10 is also provided with a corresponding number of lines 21 which come into registry with a fixed point or points 22, such as an arrow, provided in any suitable way on a stationary part associated with said indexing head, said lines 21 being so disposed that when a line is in exact registry with arrow 22 the corresponding indexing pin 20 is so located that the rotary indexing head 10 is in one of its predetermined positions.

The upper face of base plate 11 is provided with a suitable groove 23 having an enlargement 23' at its outer end (see particularly Fig. 3), and reciprocatingly mounted in said groove 23 is an arm or bar 24 whose width is such that in its path of movement it equals the distance between each pair of consecutive pins 20 and therefore passes slidably between said pair of contiguous pins (see Fig. 4), so that when located between such pins the indexing head 10 is positively locked against rotation in either direction by said arm 24. Arm 24 may be reciprocated in groove 23 in any suitable way. As shown, a rod 25 is suitably attached thereto, as by the threaded connection at 26, and the opposite end of said rod is carried in any suitable way by a cross head 27 which is reciprocatable between the side members 17. Any suitable means may be employed for reciprocating said cross head 27 at suitable intervals of time, Figs. 1 and 2 showing said cross head as attached to one or more rods 28 which in turn may be connected to the plunger of a fluid pressure mechanism, as when the indexing mechanism is to be operated by pneumatic or hydrostatic pressure, or said rod or rods 28 may be connected to any suitable mechanical device for moving the cross head 27 toward and away from the transverse member 18, the manner in which the cross head is reciprocated being no part of the present invention.

Referring more particularly to Fig. 5, arm 24 is provided with a transversely extending aperture 30 which would be vertical when the parts are assembled as viewed in the other figures. At one face of arm 24 is a recess 31 into which the aperture 30 extends, said recess being defined at one face by a wall 32 which is inclined with respect to the length of arm 24, the opposite face of said recess being provided with a generally wedge-spaced enlargement 33 (compare Fig. 5 with Figs. 3 and 4). The bottom of recess 31 also has a groove 34 of such depth that the index pins 20 may pass freely therethrough if, as preferred, the main portion of said recess 31 has a depth corresponding to the thickness of the pawl to be described. At the opposite side of the arm 24 is another recess 35 into which the opposite end of aperture 30 extends for a purpose to appear.

Rotatably mounted in aperture 30 is a pivot pin 36 on which is secured in any suitable way, against rotation with respect thereto, a pawl 37, which is located in the recess 31. The end of the pivot pin 36 is provided with a transverse slot 38 and a centrally arranged axially extending threaded aperture 39, and secured in said slot 38, as by a set screw 40, is the end 41 of a coil spring 42 whose opposite end has a straight portion 43 that engages a flat surface 44 constituting one wall of the recess 35.

When the parts are assembled with pawl 37 mounted on pivot pin 36, with pivot pin 36 disposed in its aperture 30 and spring 42 secured to the end of said pivot pin 36 and disposed in the recess 35, pawl 37 is disposed in the recess 31 and, owing to the tension of the spring 42, its lateral face 45 is normally held against the face 32 of the recess 31 with its end projecting into the groove enlargement 23'. Pawl 37, however, may move in an anticlockwise direction as viewed in Fig. 5, or in a clockwise direction as viewed in Figs. 3 and 4, against the tension of said spring 42, to withdraw into recess 31 and its extension 33 to a position such that its end does not project beyond the edge surface of the arm 24, as shown in the dotted line position 46 of Fig. 4, the end of pawl 37 preferably being beveled for this purpose at 47.

Referring now to Figs. 3 and 4, the locked position of the indexing mechanism is that at which the arm 24 is at its extreme right hand position as viewed in Fig. 4, as shown in dotted lines with the pawl 37 in its position 50. As will be apparent from this figure, the arm 24 is disposed between the two pins designated 51 and 52 in Fig. 4, so that the indexing head is positively locked against rotation with its pin 53 and associated line 21 in registry with the arrow 22. Assume now that the cross head 27 and the arm 24 attached thereto are moved to the left as viewed in the drawings. Pawl 37, which is normally held against face 32 of recess 31 by spring 42, has its end projecting into the groove extension 23' with the pin 52 in its path of movement. Consequently, pawl 37 will engage said pin 52 as the arm 24 moves to the left as viewed in the drawings, rotating pin 52 upwardly as viewed in Fig. 4, said pin moving into the recess 31, with its free end following the groove 34, to the position shown in Fig. 3. Continued movement of arm 24 to the left as viewed in the drawings will finally move pin 52 to the position formerly occupied by pin 51 in Fig. 4, bringing new pin 53 (Fig. 4) to the position formerly occupied by pin 52. In the form illustrated the upper face of base plate 11 is provided with a circular groove 54 in alignment with the row of pins 20 if the pins are of such length as not to clear the underlying portion of base plate 11.

When the arm 24 has reached its extreme leftward position as viewed in Fig. 4 the pawl 37 is in the position shown in full lines in Fig. 4. If, now the arm 24 is moved to the right as viewed in the drawings, said arm slides between the two pins at either side thereof without disturbing the new position to which the indexing head has been rotated, and when the pawl 37 reaches the position of the pin in location 52 in Fig. 4, said pawl is moved against the tension of its spring 42 into the recess 31 and its extension 33, to the position shown at 46 in Fig. 4, where it passes by said pin without moving the indexing head 10. As soon as the pawl 37 passes the pin at location 52 in Fig. 4 the spring 42 restores the pawl to its position designated 50 in this figure, so that it is now positioned to engage and actuate the pin at location 52 at the next movement of the arm 24 toward the left.

It will therefore be perceived that, by reciprocating the arm 24 periodically by any suitable mechanism, the indexing pins 20 on head 10 are engaged in succession and moved exactly through the distance represented by the spacing between two consecutive pins 20, after which the head 10 is positively locked in its new position throughout the further movement of the arm 24 and until such time as the arm 24 is again moved toward the left as viewed in the drawings to advance the head 10 to its next indexing position.

Thereby, by means of a simple and economical construction, a rotary indexing head can be periodically actuated from any suitable fluid pressure or mechanical means to advance the head to fixed predetermined positions and positively locked in said positions automatically until the next indexing function is to be effected. Accurate register of the indexing head with predetermined points is assured by simple and efficient mechanism, while displacement of the head out of such predetermined positions is positively prevented by the automatic self-locking means until the indexing mechanism is again operated. The indexing head with its supporting structure and actuating and self-locking mechanism may be readily formed into a unitary assembly which is composed of simple parts that are easy to fabricate and assemble. Thereby a highly efficient and easily operated automatic self-locking indexing mechanism has been provided which is available for a wide variety of uses.

While the embodiments of the invention illustrated on the drawings have been described with considerable particularity, it is to be expressly understood that the invention is not limited thereto, as the same is capable of receiving a variety of mechanical expressions as will now be apparent to those skilled in the art, while changes may be made in the details of construction, arrangement, proportion, size, etc., of the component parts, and parts may be replaced by equivalent parts, without departing from the spirit of this invention. Reference is therefore to be had to the claims hereto appended for a definition of said invention.

What is claimed is:

1. In a device of the character described, the combination of a rotary indexing head provided with a plurality of equally spaced indexing pins, a reciprocating arm having a width to engage slidably between each pair of contiguous pins and being mounted for reciprocation therebetween, said arm having a recess in each of two opposed faces and an aperture extending between the bottom faces of said recesses, one of said recesses extending transversely of said arm, a pivot pin mounted in said aperture, a pawl mounted on said pivot pin and disposed in said one of said recesses, and a spring connected to said pivot pin and disposed in the other of said recesses, said spring operating to normally urge said pivot pin and pawl in a direction to project said pawl from its recess but yieldable to permit withdrawal of said pawl into its recess.

2. In a device of the character described, a rotary indexing head provided with a plurality of equally spaced indexing pins, a base plate in which said head is rotatably mounted, said base plate having a groove, an arm mounted in said groove for reciprocation, said arm having a width substantially equal to the spacing between two contiguous pins and normally cooperating therewith to prevent rotatable movement of said head, said arm having a transverse recess through which the successive pins may move, and a member mounted on said arm and engageable with a pin on said head to advance said pin from one side to the other side of said arm when said arm is moved in one direction.

3. In a device of the character described, a rotary indexing head provided with a plurality of equally spaced indexing pins, a base plate in which said head is rotatably mounted, said base plate having a groove, an arm mounted in said groove for reciprocation, said arm having a width substantially equal to the spacing between two contiguous pins and normally cooperating therewith to prevent rotatable movement of said head, said arm having a transverse recess through which the successive pins may move, and a pivotally mounted pawl carried by said arm in said recess and at each movement of said arm in one direction engageable with a pin at one side of said arm for moving said pin through said recess to the other side of said arm, said pawl being mounted to move out of actuating relationship to said pins when moved in the opposite direction.

4. In a device of the character described, a rotary indexing head provided with a plurality of equally spaced indexing pins, a base plate in which said head is rotatably mounted, said base plate having a groove, an arm mounted in said groove for reciprocation, said arm having a width substantially equal to the spacing between two contiguous pins and normally cooperating therewith to prevent rotatable movement of said head, said arm having a transverse recess through which the successive pins may move, a pawl pivotally mounted on said arm in said recess, and a spring normally urging said pawl into a position in which it projects exteriorly of said recess to engage a pin at one side of said arm and move the same through said groove to the other side of said arm when said arm is moved in one direction, said pawl being movable into said recess against the tension of its spring on movement of said arm in the opposite direction.

5. In an indexing mechanism, a rotary indexing head provided with a plurality of depending equally spaced pins, a base plate in which said head is rotatably mounted, and means carried by said base plate in unitary relationship with said head and base plate for indexing said head, said means including an arm mounted for reciprocating movement on said base plate, said arm having a width equal to the spacing between two consecutive pins and normally cooperating therewith to prevent rotation of said head, said arm having intermediate its length a transverse recess through which the pins can pass, and a member pivotally mounted on said arm and normally projecting beyond the same to engage a pin at one side of said arm and move said pin through said recess when said arm is moved in one direction, said member moving out of operating relationship to said pins upon engaging a pin during movement of said arm in the opposite direction.

6. In a device of the character described, a rotary indexing head provided with a plurality of equally spaced indexing pins, an arm mounted for reciprocation relative to said head, said arm normally extending between two of said pins to prevent rotational movement of said head and having a transverse recess therein, and cam means movable with said arm and engageable with one of said two pins for rotating said head and moving said one pin through said recess upon reciprocation of said arm.

ARTHUR M. TRIPP.

REFERENCES CITED

The following references are of record in the file of this patent:

UNITED STATES PATENTS

| Number | Name | Date |
|---|---|---|
| 612,154 | Blood | Oct. 11, 1898 |
| 612,155 | Blood | Oct. 11, 1898 |
| 790,312 | Potter et al. | May 23, 1905 |
| 1,813,484 | Class | July 7, 1931 |